Patented Feb. 16, 1943

2,310,972

UNITED STATES PATENT OFFICE 2,310,972

RUBBER AND ASPHALT DISPERSION CEMENT

Harvey J. Livermore and Gordon F. Lindner, Detroit, Mich., and Henry N. Stephens, White Bear, Minn., assignors to Minnesota Mining & Manufacturing Company, St. Paul, Minn., a corporation of Delaware No Drawing. Application December 27, 1938, Serial No. 247,842

9 Claims. (Cl. 260—760)

The present invention relates to the art of adhesive materials, many of which are commonly referred to as cements. It particularly concerns cements or the like in which the adhesive components are contained or dispersed in a vehicle. In many instances the vehicle may be water or an aqueous fluid, although the use of solvent fluids, at least to some extent, it also contemplated.

It is recognized that dispersions or emulsions of asphalt and/or other bitumens or binder materials have heretofore been suggested in various patents and have been employed for many years in making articles such as roofing materials in which adhesive qualities of such emulsions were of only slight importance or of no real significance. Such materials, while perhaps being reasonably satisfactory as paving materials or flooring, for example when mixed with other materials such as aggregate or fibers, or as a component of roofing materials, otherwise was definitely limited in its field of practical utility.

One object of this invention is to provide a material having new uses and applications, as well as new and valuable properties, over those heretofore known. Another object is to provide an improved material capable of use as a cement. Still another object is to provide a "sprayable" type of cement, which is pressure-sensitive. Another object is to provide a cement which is pressure-sensitive, while at the same time, preferably also being sprayable. (Every cement which will come out through a spray gun is not considered "sprayable." It must not be stringy and must form on the surface sprayed as small droplets.) A further object is to provide a cement which will furnish good heat resistance and toughness in the final dried film. Another object is to provide an emulsion which is cheap enough to be capable of use in large quantities as a cement in industry. Still another object is to provide valuable improvements in the method of making such cements and emulsions. A further object is to provide composite or integral structures or articles in which the dried film or layer resulting from such a cement is an important part. These and other objects and advantages will appear from the description taken as a whole.

Without intending in any way to limit the invention but rather only to illustrate it, reference may be made to the building or construction of automobile bodies and the like. The invention and introduction commercially of materials of the nature herein defined has greatly changed the art of constructing auto bodies. For example, in joining felt or the like to metal, materials of the nature herein defined, which are sprayable, are now employed in large volumes and have replaced relatively crude and inconvenient prior art methods of constructing auto bodies or of joining felt in fixed relation with sheet metal pieces. For example, these cements are highly advantageous for and are used in large quantities in joining floor mats to the steel or metal floors of automobiles and in joining jute or the like to the inside of trunk compartments.

The following is illustrative of cement compositions which have been employed in large quantities, and with much success, in the auto body industry, e. g. in joining felt to metal or in joining rubber to metal, or the like.

Example 1

| | Pounds |
|---|---|
| Whole tire reclaim | 1000 |
| Oleic acid | 28 |
| Dixie clay | 350 |
| Potassium hydroxide | 10 |
| Ester gum | 200 |
| Asphalt emulsion (e. g. H X Bitumuls) | 1750 |
| Water | 750 |

The whole tire reclaim, oleic acid and Dixie clay may be mixed together on a rubber mill, such as a two-roll mill. When suitably plasticized and uniformly mixed, the mass may be immediately transferred to an internal mixer, which may be of the Werner-Pfleiderer type. The ester gum may then be added and mixed into the other ingredients, the temperature of the mix being substantially above 150° F., as is indicated by the amount of ice subsequently added to reduce the temperature of the batch to about 150° F. or of that order. Then approximately 200 lbs. of water may be added in the form of ice so as to suitably cool the mass, e. g. to about 150° F., the ice serving a dual function of supplying water and controlling temperature. Next the potassium hydroxide may be added dissolved in 20 lbs. of water, and the mixing continued for five or ten minutes. Following the addition of the potassium hydroxide a phase inversion takes place, that is, the water becomes the continuous phase and the rubber compound becomes the dispersed phase. Next the asphalt emulsion may be added and the mixing continued until a homogeneous or smooth mixture of the dispersed rubber compound and asphalt emulsion is obtained. The balance of the water may now be added and this may be somewhat more or less than the amount specified above, depending upon the degree of fluidity desired in the final product.

The nature of the ingredients set forth in Example 1 will for the most part, be understood from the description given hereinbelow of the ingredients of Example 2. The Dixie clay (also mentioned in Example 2) which was here used was a 300 mesh South Carolina kaolin type material. The ester gum was one derived from wood rosin. The asphalt emulsion of this example may be described briefly is an emulsion of 200 penetration asphalt in water containing 55% to 60% of asphalt by weight and known as a quick breaking type of emulsion, and consists of a petroleum asphalt and slightly alkaline water emulsified by the mother liquor process without the addition of soaps, fatty acids, or like saponifying or emulsifying agents, and may have the following properties:

Specific gravity 25°/25° C. Not less than 1.00.
Viscosity - Saybolt furol
(60 cc. at 25° C.)_____ 30 to 100 sec.
Total combined amount
of all saponifiable substances_____ Not more than 0.75%.
Settlement, 10 days_____ Not more than 3%.

In the making procedure described in connection with Example 1, the clay is milled into the rubber and the resulting cement has a very high tack and exceptional adhesive qualities as the result of the ingredients and/or the method described for compounding the same. Instead of milling or mixing the clay only with the rubber, oleic acid and ester gum, and adding the asphalt as an emulsion, the clay may also be milled or mixed with the dry asphalt, or equivalent, if desired, or with a mixture of asphalt, rubber, etc., prior to dispersing the adhesive in water.

While the above is an emulsion having excellent qualities of pressure sensitivity and tack, the ingredients have been compounded by us in a different manner where a cement was desired having a still better heat resistance than that of the cement of Example 1 made as above described. Although very similar to Example 1, ingredients as employed by us in producing a cement of such high heat resistance will be set forth in table form before proceeding to describe procedure for making the cement.

*Example 2*

| | Pounds |
|---|---|
| Whole tire reclaim | 172 |
| Ester gum | 34 |
| Oleic acid | 5 |
| Potassium hydroxide | 4 |
| A soap-type asphalt emulsion (e. g. so-called H X Bitumuls) | 297 |
| Clay slurry | 119 |
| Water (in addition to that otherwise provided for) | 65 |

The soap-type asphalt emulsion specified in the above example (which may be a product of the nature of that marketed by the American Bitumuls Company, of Baltimore, under the name, H X Bitumuls) is composed to the extent of about 55–60% of an asphalt which is solid at normal atmospheric temperatures, having, for example, a penetration of 100–200 at 77° F., and may have other properties as above described.

The clay slurry may consist of 407 parts of a clay such as Dixie clay, 407 parts of water, 4 parts of KOH, and a small amount of a material for increasing the fluidity, or decreasing the viscosity, of the clay slurry. The material for increasing the fluidity may, for example, be of the type of that which is available commercially under the name, "Vultamol," and, where this particular material is employed, about 8 parts may be used with the aforesaid 407 parts of clay. However, other materials may be employed in the clay slurry (and in the subsequently prepared final emulsion or cement) in lieu of that just mentioned, illustrative of which are salts of tannic acid, e. g. ammonium tannate, sodium tannate, etc. and certain other so-called wetting agents, as well as other materials not classed as wetting agents.

The whole tire reclaim, called for in the above formula, is a material, the nature of which is well known to those skilled in this branch of art. It may also be referred to as a regenerated or replasticized rubber. It may be made from scrap rubber by eliminating metal and fiber from the rubber scrap, for example mechanically, and then cooking the scrap in the presence of alkali (NaOH, for example), softeners (such as dipentene, rosin, hydrocarbon oils, pine tar, fatty acid pitches and/or asphalts, etc.) and steam under about 150 lbs./sq. in. gauge pressure, this mixture being cooked together in a digester. Subsequently, after the rubber, or mixture containing the same is discharged from the digester, it may be washed with water to eliminate excess alkali and/or soap, and dried. Following this it may be worked together on an ordinary rubber mill, and, during the milling, some material such as a finely divided pigment or filler, e. g. a powder such as clay or whiting or a material capable of aiding in producing a smooth or homogeneous batch, may be added to facilitate the refining of the regenerated rubber, as a result of which it can usually be sheeted out into tissue paper thickness. Following the above initial refining, the initially milled rubber may be, for example, passed through a strainer in the nature of a large meat grinder, or the like, from which the rubber may be extruded like spaghetti. Following this, the rubber may be further refined on a set of rollers, then wound up in sheet form on a drum and then cut from the drum and stored as a slab. This material may constitute the "whole tire reclaim" specified in the above table or example.

It will be understood that the above described method of arriving at the "whole tire reclaim," suitable for use in the above formula or example, is illustrative only and, while it constitutes an advantageous method, may be replaced by various other reclaiming processes known to men skilled in this art. It will be also clear that it is a matter of choice whether the source of the rubber is old tires or some other form of vulcanized or scrap rubber.

In making a cement or emulsion having the above (or equivalent) formula, the whole tire reclaim may first be milled or worked to restore or increase its plasticity. This may be accomplished on an ordinary rubber mill in a relatively short time, e. g. about 20 minutes, more or less. Then the whole tire reclaim may be placed in or fed into a mixer, an internal mixer, for example of the Werner-Pfleiderer type, being illustrative. After the rubber works together, the ester gum may be added, slowly or a little at a time, so as to avoid breaking up the rubber into separate particles. Each addition of ester gum is preferably thoroughly incorporated before a subsequent addition is made, and the addition of ester gum is gradual enough so that an action of the ester gum on the rubber which may be referred to as a "lubricating action" (for want of a better term) will not deleteriously affect the cohesion or unity of the plasticized rubber reclaim. During this operation the mixer (and hence also the rubber) is heated by passing steam under 10 lbs./sq. in. gauge (239° or 240° F.) into the jacket which surrounds the mixer, so that the mix is kept sufficiently mobile to be conveniently workable. When the ester gum, or the like, is thoroughly incorporated with the rubber, the steam may be turned off and cool water circulated into and through the jacket of the mixer. Then the oleic acid (or material which will function similarly) is added, all at once, if desired.

Following this addition (the mixing continuing in the meantime), about 25 pounds of ice and approximately 10 pounds of water may be added. The rubber mix should be reduced to a temperature below about 160° F. and usually should preferably be below 155° or 150° F., best results ordinarily being aided by temperatures between 140° and 150° F., and the proportion of water and ice should be adjusted so as to accomplish this temperature reduction without adding too much water or without exceeding the maximum optimum water content prior to inversion. If this feature of control is not adhered to, the batch of cement may be ruined.

After the water is thoroughly incorporated with the rubber mix (by the agitation or kneading action of the mixer), the alkali, e. g. KOH, dissolved in approximately 8 pounds of water may be added, while the agitation and mixing is continued. Then more water may be added, e. g. about 2 gallons (16.6 lbs.), fairly rapidly or even all at once. The resulting material is an emulsion which may be fairly stiff or plastic in nature.

In the course of manufacture, prior to the addition of the alkali the rubber is in the continuous phase and the water is in the dispersed phase. Subsequent to the time when the addition of alkali begins, an inversion takes place, with the water then forming the continuous phase and the rubber reclaim forming the dispersed or discontinuous phase of the emulsion.

Next the asphalt emulsion called for in the above formula or its equivalent, can be added, a fairly rapid addition being satisfactory and the mixing being continued until the ingredients are well mixed.

The clay slurry, for example of the type illustrated in the above formula, can now be added and the rate of addition may be fairly rapid.

Following this, the remainder of the water (if there is any remainder) may be added to bring the emulsion to the specified solid content (i. e. ratio of solids to liquids) or the desired viscosity or fluidity. Where extra ice is required in the course of the process, over that specified above by way of illustration, then it sometimes happens that no further amounts of water, or only slight amounts of water, are added at this point.

While the above method of making an emulsion or cement is an advantageous one, and is described in considerable detail, except where unusually high heat resistance is desired the method described in connection with Example 1 is often preferred. Other alternative or substitute methods may be employed and are contemplated within the scope of the present invention. The ingredients need not be added in the exact order specified and the particular ingredients named may be replaced respectively by equivalents or substitutes.

For example, instead of adding the asphalt or other bitumen as an emulsion to the plasticized rubber, the asphalt or the like may be added as such (not as an emulsion) to the rubber and admixed therewith, as by plasticizing or kneading. The addition of the asphalt may be made after the ester gum but in many cases it is preferably added before the ester gum or the like. If the asphalt is added according to this procedure, the water which would be added with the asphalt, according to Example 2 above given, would, as will be appreciated, have to be supplied separately. Also soap or other substitute dispersing or stabilizing or modifying agent or agents should (to obtain a similar final result) be separately supplied or provided for to compensate for not adding it as the preformed soap in the emulsion.

The functions of the ester gum mentioned above include increasing the "tack" or tackiness of the rubber and aiding the manufacture by making the reclaimed rubber easier to work. The ester gum, which may be composed of the reaction product of glycerol and rosin, may be replaced by other low acid tack-producers such as "Nevillite" resin (a synthetic hydrocarbon resin composed of mixed polymers of indene and cyclopentadiene) and though less practical, may be replaced, in part (or in certain instances entirely) by esters of other polyhydric compounds, e. g. rosin esters of other trihydric alcohols. By way of further illustration, the rosin ester of diethylene glycol, though less desirable than the rosin ester of glycerine, may be employed to partially or entirely replace the latter.

To effect further economies in cost of cement, higher proportions of asphalt than above mentioned may be employed, and the ester gum content may be decreased while still maintaining the same "tack" in the final dried film of cement. Furthermore, depending upon the particular character of the reclaimed rubber and the softeners or modifiers employed in its making, it is often permissible very substantially to reduce the proportion of ester gum specified in the above tables or examples and yet arrive at a cement having a satisfactory tack. Again, where the proportion of rubber to other organic materials in the cement is reduced, the ester gum may be reduced in amount while maintaining the same tack. In this connection, it will be understood that, in cases where the rubber-asphalt ratio is reduced or where the rubber is present in only relatively small amounts, the ester gum content may be greatly reduced or substantially omitted. However, the ester gum is not confined in its effect to the rubber and in a number of instances does notably and favorably affect the characteristics or adhesiveness of the asphalt or bitumen, although in many cases ester gum would not be used unless it also serves some other useful function.

While the ratio of asphalt to rubber, or to rubber and ester gum, may be varied above or below that provided in the above table or example, if the ratio of asphalt to rubber were greatly increased, e. g. were trebled, while maintaining the same degree of tackiness by adjusting the content of clay or equivalent, the resulting product would be inferior as a cement for many uses because (unless this were otherwise compensated for) the final dried cement film would have poorer heat resistance (i. e. a high temperature susceptibility) and also would have less cohesive strength. Decreased elasticity and a change in tack retention properties also generally accompany a substantial increase in the proportion of asphalt to rubber, unless this tendency is offset by other means which are not a specific subject of this application. However, the adhesion, at low temperatures approximating room temperatures, of the cement, for example to metal, is improved by increasing the ratio of asphalt to rubber above that specified in Example 2, hereinabove set out, and also a more economical product is arrived at.

The clay slurry called for in the above table or example, though above described as containing particular proportions of a relatively non-colloidal or low colloidal clay and particular modifying agents, may contain less or more clay depending upon the degree of heat resistance desired or demanded in the final dried film and also depending upon the character and colloidal content of the clay or the like. The use of intermediate or high colloidal clays is also contemplated. However, low colloidal clays, such as Dixie clay (i. e. a domestic kaolin), have the advantage over clays such as bentonite in that, in the resulting dried films from cements made therewith, for equal film hardness, the film of the emulsion or cement made with Dixie clay has better water-resistance than a film of the emulsion made with bentonite. Also, for equal film hardness, a more tacky adhesive is produced with a domestic kaolin such as Dixie clay than with bentonite. Bentonite masks the tack of the cement and lowers its pressure-sensitivity in film form.

The potassium hydroxide provided in the clay slurry, though advantageous, is not indispensible and may be omitted, or replaced by other materials. An important use of it may be in preventing the breaking of the rubber-asphalt emulsion when the clay slurry is added, but such an undesirable occurrence can also be avoided or deterred by the manner of adding the clay slurry and by the manner and conditions under which admixture is effected.

As a matter of fact the clay need not be even added in the form of a slurry. Despite the fact that others have considered it impossible, or at least to our knowledge have never employed such procedure, we have found that the clay may be added in the dry or powdered state, e. g. to the bituminous emulsion, and still will associate itself in the emulsion in relation to dispersed asphalt particles so as to provide a good cement. Also it may be added in dry or powdered state after rubber and asphalt have been mixed or plasticized together and dispersed in an aqueous fluid, the latter forming the continuous phase of an emulsion. A contribution of importance is that by those methods of combining the clay with the asphalt and/or rubber, contrary to what might be expected (as well as by other methods herein described), a substantial portion of the clay, e. g. the more colloidal portions thereof, associates itself with respect to the dispersed asphalt and/or rubber particles so as favorably to affect the emulsion and to increase the heat resistance of the resulting final dried film. Even in the case where dry clay is milled into the rubber and/or asphalt or like adhesive, before the adhesive is emulsified, we have found that an appreciable proportion of the clay eventually occurs in the external phase of the emulsion produced and contributes to valuable properties of the cement, including heat resistance.

The soaps above provided for may be replaced, in whole or in part, by other dispersing or stabilizing agents or modifiers, e. g. potassium abietate. Other substitute materials for these purposes will occur to those skilled in this art in the light of this disclosure.

In place of the "Vultamol" employed in the clay slurry, as above specified, materials such as certain salts of tannic acid, e. g. alkali or ammonium tannates, may be employed to increase the fluidity of the clay slurry while also serving other useful functions. Tannates and tannic acid are useful in inhibiting scaling or rust formation, for example of ferrous metals.

Where it is desired to produce a product more in the nature of a "sealer," rather than an adhesive cement as described above in detail, this may be done by lowering the ester gum content or by entirely eliminating it. Also the ratio of asphalt to rubber is, in general, increased, as also is the solid content of the emulsion. That is, a higher viscosity is normally desired in the case of "sealers" than in adhesives or adhesive cements. In the adhesive cements, whose analysis is given in the above example or table, the ratio of water to solids is about 1 to 1½, whereas in sealers the ratio of water to solids is normally much lower and may be, for example, of the order of 1 to 3 or 1 to 4 or so.

Omitting the water content of the emulsion or cement of Example 2, the other materials, as will be seen, are present in approximately the following proportions by weight:

| | Per cent |
|---|---|
| Whole tire reclaim | 38 |
| Asphalt | 38 |
| Dixie clay | 13 |
| Ester gum | 7½ |
| Oleic acid, Vultamol, KOH, etc., about | 3½ |

It is to be observed that the whole tire reclaim may have a so-called "rubber content" of 40–50%, with the remainder of the rubber reclaim being made up of common compounding ingredients, including softeners, refining agents, etc., such as hereinabove referred to. In the specific example above, the rubber reclaim had a rubber content of approximately 41%. Hence it will be seen that the asphalt or bitumen is present in a greater proportion by weight than the rubber content of the reclaim in the above formula.

In the making of cements or emulsions of this type, where a reclaim as above indicated is employed, it is advantageous that (in the adhesive portion thereof), the ratio of reclaim to asphalt be within the range of 3:1 to 1:2, while it is preferred that the ratio of reclaim to asphalt be within the range of 2.5:1 to 1:1.5 or 1:1.25, it being advantageous for the asphalt content not to exceed, or at least not very greatly to exceed, by weight, the content of reclaimed or devulcanized rubber. The above ratios are based on a whole tire reclaim having a so-called rubber content between 40 and 45%. In connection with other reclaims, having a different rubber content, the above ratios would have to be adjusted accordingly. An important advantage or function of the asphalt content, and especially of an asphalt content (or asphalt to rubber ratio) as high or higher than that given in the above formula or example is that at lower temperatures, e. g. at room temperatures, the adhesive cement will stick to metal much better than where lower amounts of asphalt or no asphalt are employed.

While about 7½% of the solids in the above formula is ester gum or equivalent, as above indicated, lower quantities of this ingredient, for example 4 or 3 per cent, or even lower, may be sufficient under certain circumstances, such as where the reclaimed rubber itself has a fairly good tack and/or where the use for which the cement is to be employed does not require as much surface tack or where the desired tack is compensated for in some other way. As a matter of fact, by varying components of the cement, as illustrated in Example 3 given below, the ester gum content may be omitted altogether or, rather, may be replaced by other tack producers.

Another illustrative dispersion type cement, differing substantially from those set out in Examples 1 and 2, and, in a number of respects, possessing important advantages over those described, is as follows:

Example 3

|  | Pounds |
| --- | --- |
| Inner-tube reclaimed rubber | 675 |
| Asphalt | 1013 |
| Wood rosin | 118 |
| Potassium hydroxide | 12 |
| Water | 900 |

One method by which these ingredients may be advantageously compounded will be given by way of illustration.

The inner-tube reclaim may be first warmed and softened by mixing on a two-roll rubber mill or the equivalent. The warmed and plasticized reclaim may then be transferred to an internal mixer, which latter may be of the Werner-Pfleiderer type, or other type, as hereinabove referred to. The asphalt and rosin may be added in small portions to the reclaim and the mixing continued until a smooth mixture of reclaimed rubber, asphalt and rosin is obtained. Approximately 200 lbs. of water may now be added in the form of ice. The 12 lbs. of potassium hydroxide may next be added dissolved in 24 lbs. of water. Following the addition of the potassium hydroxide, a phase inversion takes place, the rubber-asphalt mixture becoming dispersed in the aqueous vehicle. (More or less alkali may be required, depending upon the alkali content of the reclaim and the acid number of the rosin. It is necessary to have the mix at least slightly alkaline in order to secure a dispersion of the adhesive in water. In general, a lower alkalinity is satisfactory with dispersions high in asphalt than in dispersions high in reclaim.) The balance of the water may now be added and the mixing continued until the desired fluidity is obtained.

The asphalt employed in the formula of Example 3, was a steam refined California residual petroleum asphalt, having a melting point (ball and ring method) of approximately 125° F. and a penetration at 77° F. of 50–60.

The particular rosin employed had an acid number between 120 and 130.

The dispersion illustrated by Example 3, however, is quite different from both the cement of Example 1 and that of Example 2 in a number of respects. In Example 3 an appreciably different type of reclaimed rubber is employed. Also, by way of distinction over both Examples 1 and 2, in the cement of Example 3 potassium rosinate is used as a dispersing agent or protective colloid, and the dispersed phase comprises reclaim and asphalt (together with the non-acid portion of the rosin) without ester gum. Further, in the case of Example 3, an adhesive mixture consisting of 2 parts of reclaim and about 3 parts of asphalt are dispersed in water. As distinguished from one of the illustrative methods of compounding the ingredients of Example 1, set out hereinabove, no clay is used in the formulation of Example 3.

The cement of Example 3 has a much longer tack retention than the cement of Examples 1 and 2. Whereas asphalt is considered advantageously to affect or control the tack of the cement of all three examples, and ester gum advantageously affects that of Examples 1 and 2, the rosin soap contributes important qualities to the tackiness of the cement of Example 3 and especially improves the adhesion of the cement to metals, such as iron, steel, stainless steel, chromium finishes, etc. The exceptionally good adhesion of the cement of Example 3 to metals having an oily surface, is especially valuable. The longer period of tack retention of the cement of Example 3, as compared with the cements of Example 1 and Example 2, is considered to be due, to an important degree, to the use of inner tube reclaim and to the use of rosin soap.

In place of the rubber or reclaim above illustrated, other suitable high molecular weight polymers or elastic materials of a rubbery nature, whether or not of synthetic origin, are contemplated, it being preferred that such products be controlled or modified so that they furnish desired properties of adhesiveness.

By following the teaching set forth hereinabove, particularly in connection with the three illustrative examples given, it will be seen that it is possible to control the tackiness and pressure-sensitivity of such cements within a substantial range, and it is also readily possible to make cements of this general type which will remain pressure-sensitive over an extended period of time.

In each of the above illustrated cements, if the reclaim in each case is reduced to its so-called rubber content, it will be seen, as illustrated by the examples, that said so-called rubber content is present in the cement to the extent of about 40 or 45% of the bitumen or asphalt. However, a wider ratio of rubber or reclaim to asphalt is comprehended within this invention, and in the types of cement herein illustrated, as pointed out hereinabove following Example 2.

While the cements illustrated by each of the above examples are pressure-sensitive, sticky compositions when dry, the pressure-sensitivity of the cement of Example 2 will last only a relatively short time, as compared with the cement of Example 3. The tack retention of Example 1 is usually intermediate that of the cements of Examples 2 and 3, although if desired, this cement may be made so that its tack retention is greater than that of Example 3. The optimum time for making bonds with a cement of the type of that shown in Example 2 is from about three minutes to one-half (½) hour after it is sprayed onto or otherwise applied to a metal or other desired surface. The good tack and setting properties of these types of cement make them valuable for many uses, such as in joining fabric or felt to metal, as in the case of automobile construction, for example. In attaching floor pads to the metal floors in automobile bodies, attaching jute to the trunk compartments thereof, etc., these types of cement have been used with favorable results and adapt themselves advantageously to the assembly lines of automobile plants.

The cements hereinabove illustrated are of a sprayable type and also have other properties which have made it possible advantageously to use them in place of gasoline solvent cements for these and other purposes, gasoline solvent cements having the disadvantage of providing a fire hazard.

It will be appreciated that the novelty and importance of pressure-sensitive water dispersions of rubber and/or asphalt, which may be used in attaching fiber to metal, for example, is a development entirely new and distinct over the use of certain water dispersions of rubber for coating the backs of rugs or the like, where the function of the dispersion was as a sizing or anti-slip treatment. As distinguished from this, cements or dispersions of the type hereinabove illustrated possess a good tack and strong adhesive qualities which were neither required nor possessed by compositions used as rug sizing.

A cement of the type herein illustrated, e. g. that of Example 3 may be made so that it retains its pressure-sensitive properties for an hour, or even several hours or more, if desired.

While the present invention is illustrated by various specific examples, and also by detailed discussion, it will be understood that all variations and embodiments are contemplated which come within the scope of the appended claims.

What we claim is:

1. The method of making an oil-in-water type dispersion which comprises blending together reclaimed rubber and asphalt at a temperature above about 200° F. to form a uniform mass; incorporating water in such mass by mixing and mastication to form a uniform dispersion of the water-in-oil type, while gradually reducing the temperature of said mass, said water being incorporated in sufficient amount but not greatly in excess of that amount which is sufficient to permit subsequent inversion of phase solely upon bringing a dispersing agent into uniformly disseminated contact with said water-in-oil dispersion; and then, while maintaining said water-in-oil dispersion at a temperature of approximately 140°–160° F., bringing a dispersing agent into uniformly disseminated contact therewith, so that inversion of phase takes place forthwith.

2. The method of making a water-dispersed adhesive composition which comprises blending together reclaimed rubber and an asphalt, and a soap-forming acid at a superatmospheric temperature at least approximating 200° F. to form a uniform mass; then simultaneously cooling and incorporating water in said mass by introducing said water partly in the form of ice while continuing the kneading and mastication to form a uniform dispersion of the water-in-oil type, said water being added to an extent by weight less than one-fourth that of the solids aforementioned, and in sufficient amount, but not greatly in excess of that minimum amount which is sufficient to permit subsequent inversion of phase merely upon the formation of a soap dispersing agent; and then, while maintaining said water-in-oil dispersion within a restricted temperature range, approximating 140 to 160° F., adding alkali thereto in sufficient amount to render the batch alkaline while continuing kneading and mastication of the said dispersion, said soap dispersing agent being thus formed in situ throughout said dispersion in uniformly disseminated contact therewith, and inversion of phase taking place forthwith upon the formation of said dispersing agent.

3. The method of making an adhesive composition which comprises working together rubber, a resinous material including asphalt and a soap-forming acid at a temperature above about 200° F. in an internal mixer to form a smooth mass, then simultaneously cooling the resulting mixture and introducing a limited amount of water thereinto by introducing the same partly in the form of ice while continuing the mixing, and then when the amount of water introduced into the mass is sufficient, but not greatly in excess of that amount which is sufficient, to permit inversion of the emulsion upon the addition of alkali hydroxide and, while maintaining the temperature of the mass in the range of 140° to 160° F., adding an alkali hydroxide thereto in a sufficient amount to effect inversion of the dispersion, whereupon water becomes the continuous phase and the mixture comprising rubber and resinous material including asphalt is dispersed therein.

4. The method of making a water-dispersed adhesive composition which comprises intimately intermixing reclaimed rubber and a compatible resinous material including ester gum and asphalt and a soap-forming acid, said mixing being effected at a superatmospheric temperature of the order of 240° F., uniformly dispersing throughout such composition, a minor proportion of water, the amount of water introduced into the mass being sufficient, but not greatly in excess of that amount which is sufficient to permit inversion of the dispersion upon the addition of an alkali metal hydroxide; and, while maintaining the temperature of said mass of the order of 150° F., adding an alkali metal hydroxide thereto to form a soap in sufficient amount to effect inversion of the dispersion, whereupon a smooth inversion of the dispersion is effected, water thereupon becoming the continuous phase and the mixture of rubber and resinous material being dispersed therein.

5. The method of making a water-dispersed adhesive composition which comprises blending together rubber and a bitumen, and a soap-forming acid, at a superatmospheric temperature above about 200° F. to form a smooth mass; then introducing a limited amount of water into said mass while continuing the mixing, to form a uniform dispersion of the water-in-oil type; and then, when the amount of water introduced into the mass is sufficient but not greatly in excess of that amount which is sufficient, to permit inversion of the dispersion upon the addition of alkali hydroxide and, while maintaining the temperature of the mass within a restricted range approximating 140°–160° F., adding an alkali thereto while continuing the mixing so that a soap-dispersing agent is thereby formed throughout said water-in-oil dispersion and inversion of phase forthwith takes place, yielding an oil-in-water type dispersion.

6. A sprayable adhesive dispersion of the oil-in-water type and of viscous consistency prepared in accordance with the process of claim 5, said dispersion having a plurality of ingredients, the predominating solid ingredients comprising rubber and a compatible tack-producing agent including a bitumen, said dispersion being of fine particle size and resistant to change in viscosity upon ageing, and having a low viscosity for its solids content, and further characterized in that upon the evaporation or partial evaporation of water it yields a highly tacky, pressure-sensitive adhesive film which is highly resistant to redispersion in water.

7. A sprayable adhesive dispersion of the oil-in-water type and of viscous consistency prepared in accordance with the process of claim 3, said dispersion having a plurality of ingredients, the predominant solids ingredients comprising rubber and a resinous material including asphalt, said dispersion being of fine particle size and resistant to change in viscosity upon ageing, and having a low viscosity for its solids content, and further characterized in that upon evaporation of a substantial proportion of its water it yields a highly tacky pressure-sensitive adhesive film, said film being highly resistant to redispersion in water.

8. A sprayable adhesive dispersion of the oil-in-water type and of viscous consistency prepared in accordance with the process of claim 4, said dispersion having a plurality of ingredients, the predominant solids ingredients comprising reclaimed rubber and a resinous material including asphalt, said dispersion being of fine particle size and resistant to change in viscosity upon ageing, and having a low viscosity for its solids content, and further characterized in that upon evaporation of a substantial proportion of its water it yields a highly tacky pressure-sensitive film which, upon application under slight pressure, will tenaciously adhere to smooth metal surfaces, said film being highly resistant to redispersion in water.

9. A sprayable adhesive dispersion of the oil-in-water type and of viscous consistency prepared in accordance with the process of claim 1, said dispersion having a plurality of ingredients, the predominating solids ingredients comprising rubber and asphalt, said dispersion being of fine particle size and resistant to change in viscosity upon ageing, and having a low viscosity for its solids content, and further characterized in that upon the evaporation or partial evaporation of water it yields a highly tacky, pressure-sensitive adhesive film which is resistant to redispersion in water.

HENRY N. STEPHENS.
HARVEY J. LIVERMORE.
GORDON F. LINDNER.